(12) United States Patent
Chen et al.

(10) Patent No.: US 11,256,047 B2
(45) Date of Patent: Feb. 22, 2022

(54) OPTICAL ASSEMBLY

(71) Applicant: InnoLight Technology (Suzhou) LTD., Jiangsu (CN)

(72) Inventors: Long Chen, Jiangsu (CN); Dengqun Yu, Jiangsu (CN); Donghan Wang, Jiangsu (CN); Yuzhou Sun, Jiangsu (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 0 days.

(21) Appl. No.: 17/103,471

(22) Filed: Nov. 24, 2020

(65) Prior Publication Data

US 2021/0157072 A1 May 27, 2021

(30) Foreign Application Priority Data

Nov. 27, 2019 (CN) .......................... 201922075201.9

(51) Int. Cl.
G02B 6/42 (2006.01)
H04B 10/60 (2013.01)
H04B 10/50 (2013.01)

(52) U.S. Cl.
CPC ......... *G02B 6/4244* (2013.01); *G02B 6/4204* (2013.01); *G02B 6/4239* (2013.01); *H04B 10/50* (2013.01); *H04B 10/60* (2013.01)

(58) Field of Classification Search
None
See application file for complete search history.

(56) References Cited

U.S. PATENT DOCUMENTS

| 4,488,307 A | * | 12/1984 | Garmire | H01S 5/20 372/45.01 |
| 4,799,226 A | * | 1/1989 | Mito | H01S 5/2232 372/102 |
| 11,137,557 B2 | * | 10/2021 | Chen | G02B 6/4239 |
| 2006/0222042 A1 | * | 10/2006 | Teramura | H01S 5/02325 372/101 |

(Continued)

FOREIGN PATENT DOCUMENTS

| CN | 101346646 B | 4/2011 |
| CN | 106772891 A | 5/2017 |

(Continued)

*Primary Examiner* — Jerry Rahll
(74) *Attorney, Agent, or Firm* — Finnegan, Henderson, Farabow, Garrett & Dunner, LLP

(57) ABSTRACT

An optical assembly includes a carrier plate, a light emitting element and a lens component disposed on the carrier plate, and a securing block. The securing block has a first surface and a light-passing portion that are located on an optical path of an output light from the light emitting element. The lens component includes a lens portion and a connecting portion. The lens portion is located on the optical path. The connecting portion has a second surface facing the first surface of the securing block. A bottom surface of the securing block is bonded to the carrier plate. The lens component is secured onto the carrier plate by means of bonding between the second surface and the first surface of the securing block. A clearance space is present between the lens portion and the light-passing portion so that the lens portion does not contact the securing block.

11 Claims, 4 Drawing Sheets

(56) References Cited

U.S. PATENT DOCUMENTS

| | | | |
|---|---|---|---|
| 2012/0294326 A1* | 11/2012 | Seibert | G02B 7/025 372/50.23 |
| 2015/0349488 A1* | 12/2015 | Kimura | H01S 5/02326 359/641 |
| 2015/0380896 A1* | 12/2015 | Kimura | G02B 19/0052 359/641 |
| 2020/0233161 A1 | 7/2020 | Chen | |
| 2021/0157072 A1* | 5/2021 | Chen | G02B 6/4244 |

FOREIGN PATENT DOCUMENTS

| | | |
|---|---|---|
| CN | 109613655 A | 4/2019 |
| CN | 109696730 A | 4/2019 |
| CN | 209356715 U | 9/2019 |

\* cited by examiner

OPTICAL ASSEMBLY

CROSS-REFERENCE TO RELATED APPLICATION

This application is based upon and claims priority to Chinese Patent Application 201922075201.9, filed on Nov. 27, 2019, the entire content of which is incorporated herein by reference.

FIELD OF THE DISCLOSURE

The present application relates to the field of optical communication technology and, more particularly, to an optical assembly.

BACKGROUND

In the field of optical communication, especially in optical modules, lens components are necessary for focusing, coupling, or collimating optical signals. With related technology, coupling by a high-magnifying-power lens or collimation by a collimating lens typically occurs in a scenario where a thermoelectric cooler (TEC) is used as a temperature control platform. During use, it is typical to place a semiconductor laser, a high-magnifying-power lens or a collimating lens, and a receiver assembly (a PIC (photonic integrated circuit), a PLC (planar lightwave circuit), an optical fiber, or another optical waveguide device) all on the TEC and in a hermetic package. Epoxy resin used for securing a high-magnifying-power lens or a collimating lens has a relatively high coefficient of thermal expansion and is relatively sensitive to erosion by moisture in the environment. Therefore, temperature changes or moisture absorption will result in significant deviation in the position of the lens from its ideal position. This will cause functional deterioration or failure of the entire device.

Additionally, in a small package, the size of the lens itself is relatively small, and cutting of a side of the lens during mass production (if a silicon lens or a batch molded lens is used) may lead to a problematic angle of a side of the lens, which makes the lens difficult to be grasped with a gripping device during assembly.

In order to solve the aforementioned problems, a Chinese patent application, Optical Assembly and Manufacturing Method Thereof (Application No. 201910042389.9, which corresponds to U.S. Patent Publication No. 2020/0233161 A1), discloses an optical assembly comprising a base plate, and a light transmitting component and a lens component that are configured on the base plate along an optical path, a supporting member, and an auxiliary member. The supporting member comprises a bottom surface that connects to the base plate and a side surface that connects to the auxiliary member. The auxiliary member comprises a connecting surface that connects to the lens component and a bonding surface that connects to a side surface of the supporting member. A bottom surface of the supporting member bonds to the base plate so that a bottom surface of the auxiliary member and a bottom surface of the lens component are both higher than a top surface of the base plate. Using a supporting member and an auxiliary member to cooperate with the assembly of the lens component, this assembly appears to address the aforementioned problems, but at the same time appears to introduce the problem of difficulty in controlling operational consistency and product reliability, thus having relatively low operability.

SUMMARY

The present disclosure includes provides an optical assembly that solves the reliability problem caused by uneven glue layer thickness and at the same time further improves operational consistency and product reliability and provides high operability.

One embodiment of the present disclosure provides an optical assembly comprising a carrier plate, a light emitting element and a lens component disposed on the carrier plate, and a securing block.

The securing block has a first surface located on an optical path of an output light from the light emitting element, and a light-passing portion arranged on the optical path.

The lens component comprises a lens portion and a connecting portion, the lens portion is located on the optical path, and the connecting portion has a second surface facing the first surface of the securing block.

A bottom surface of the securing block is bonded to the carrier plate, and the lens component is secured onto the carrier plate by means of bonding between the second surface of the connecting portion and the first surface of the securing block.

A clearance space is present between the lens portion and the light-passing portion.

DETAILED DESCRIPTION

Figure 1:
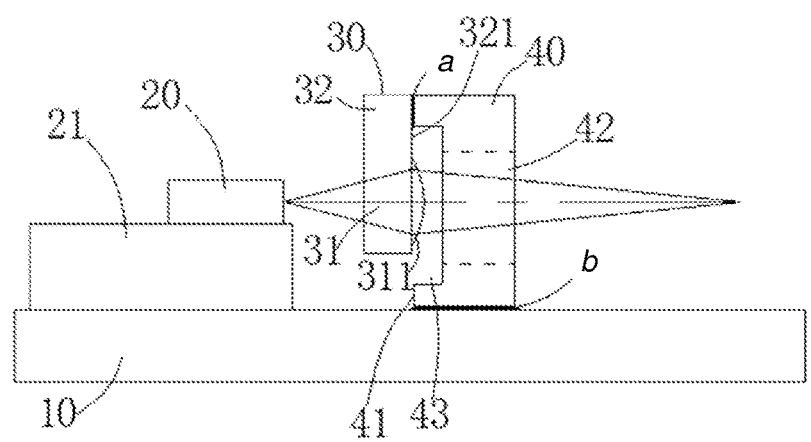
FIG. 1 is a structural diagram of an optical assembly according to an embodiment of the present disclosure.

The text below provides a detailed description of the present disclosure in conjunction with specific embodiments illustrated in the attached drawings. However, these embodiments do not limit the present disclosure. The scope of protection for the present disclosure covers changes made to the structure, method, or function by persons having ordinary skill in the art on the basis of these embodiments.

In order to facilitate the presentation of the drawings in the present disclosure, the sizes of certain structures or portions have been enlarged relative to other structures or portions. Therefore, the drawings in the present application are only for the purpose of illustrating the basic structure of the subject matter of the present application.

Additionally, terms in the text indicating relative spatial position, such as "upper," "above," "lower," "below," and so forth, are used for explanatory purposes in describing the relationship between a unit or feature depicted in a drawing with another unit or feature therein. Terms indicating relative spatial position may refer to positions other than those depicted in the drawings when a device is being used or operated. For example, if a device shown in a drawing is flipped over, a unit which is described as being positioned "below" or "under" another unit or feature will be located "above" the other unit or feature. Therefore, the illustrative term "below" may include positions both above and below. A device may be oriented in other ways (rotated 90 degrees or facing another direction), and descriptive terms that appear in the text and are related to space should be interpreted accordingly. When a component or layer is said to be "above" another member or layer or "connected to" another member or layer, it may be directly above the other member or layer or directly connected to the other member or layer, or there may be an intermediate component or layer.

FIG. 1 is a structural diagram of an optical assembly 100 according to an embodiment of the present disclosure. As illustrated in FIG. 1, an optical assembly of the present application comprises a carrier plate 10, a light emitting element 20 and a lens component 30 disposed on the carrier plate 10, and a securing block 40. The securing block 40 has a first surface 41 located on an optical path of an output light of the light emitting element 20, and a light-passing portion 42 arranged on the optical path. In one embodiment, the first surface 41 is a flat surface. The lens component 30 comprises a lens portion 31 and a connecting portion 32. The lens portion 31 is located on the optical path and is configured to collimate or couple the output light from the light emitting element 20. The connecting portion 32 has a second surface 321 facing the first surface 41 of the securing block 40, the second surface 321 being configured to connect to the securing block 40. In one embodiment, the second surface 321 is a flat surface. A bottom surface of the securing block 40 is bonded to the carrier plate 10. The lens component 30 is secured onto the carrier plate 10 by means of bonding between the second surface 321 of the connecting portion 32 of the lens component 30 and the first surface 41 of the securing block 40. In other words, the lens component 30 is installed on the carrier plate 10 by means of the securing block 40 and has no direct contact with the carrier plate 10, thereby preventing, if a bottom portion of the lens component 30 was to be glued to the carrier plate 10, the problem of uneven glue thickness at the bottom portion of the lens component 30 that may be caused by a cutting angle. A clearance space is present between the lens portion 31 of the lens component 30 and the light-passing portion 42 of the securing block 40, so that the lens portion 31 does not contact the securing block 40, thereby protecting a lens of the lens portion 31 from contamination or damage by the glue or the securing block.

During assembly, the lens component 30 and the securing block 40 are placed on the carrier plate 10 and on the optical path of the output light from the light emitting element 20, and glue is dispensed between the second surface 321 of the connecting portion 32 of the lens component 30 and the first surface 41 of the securing block 40, and between the bottom surface of the securing block 40 and the carrier plate 10. By applying pressure to press a glue layer b between the securing block 40 and the carrier plate 10, and by grasping the lens component 30 with a gripping device or a suction nozzle and moving the lens component 30 closer to a glue dispensation area between the lens component 30 and the first surface 41 of the securing block 40 and applying pressure against the glue dispensation area, the thicknesses of a glue layer a between lens component 30 and the securing block 40 and the glue layer b between the securing block 40 and the carrier plate 10 may be ensured to be small enough, typically being less than 20 µm, or even reaching a thickness of less than 10 µm. The optical assembly 100 is started up to cause the light emitting element 20 to output an optical signal, the positions of the lens component 30 and the securing block 40 are adjusted for the purpose of coupling or collimating, and then the glue layer a between the second surface 321 of the connecting portion 32 of the lens component 30 and the first surface 41 of the securing block 40 and the glue layer b between the bottom surface of the securing block 40 and the carrier plate 10 are cured so that the lens component 30 is secured onto the carrier plate 10 by means of the securing block 40. Adjustment of the lens component 30 may be realized along the horizontal and vertical dimensions on a plane perpendicular to the optical path, and adjustment along a third dimension other than the horizontal and vertical dimensions may be realized by moving the lens component 30 and securing the securing block 40 together along the direction of the optical path. In other words, the structure of the optical assembly 100 of the present embodiment enables the adjustment of the position of the lens portion 31 along three dimensions by means of moving the securing block 40 and the lens component 30 in coordination, thereby achieving precise coupling or collimating. In addition, the structure of the optical assembly 100 of the present embodiment makes it easy to control the thickness of the glue layer a or b in each bonding area within a small range, thereby preventing the position of the lens in the lens portion 31 from deviating easily as a result of temperature changes or moisture absorption when the glue layer a or b is too thick or uneven. Moreover, the structure of the securing block 40 is reasonably designed and reduces the number of components used for securing, further improving operational consistency and product reliability and providing high operability.

First Embodiment

Figure 2:
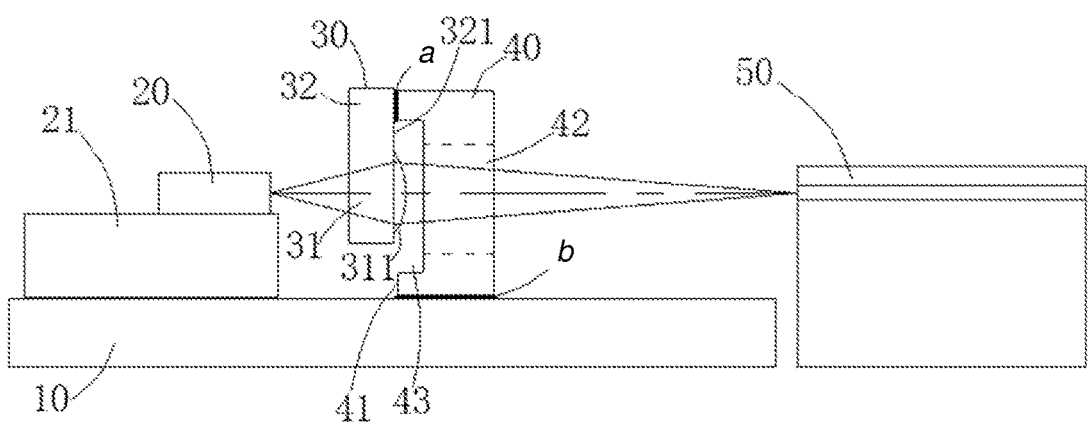
FIG. 2 is a structural diagram of an optical assembly according to a first embodiment of the present disclosure.
Figure 3:
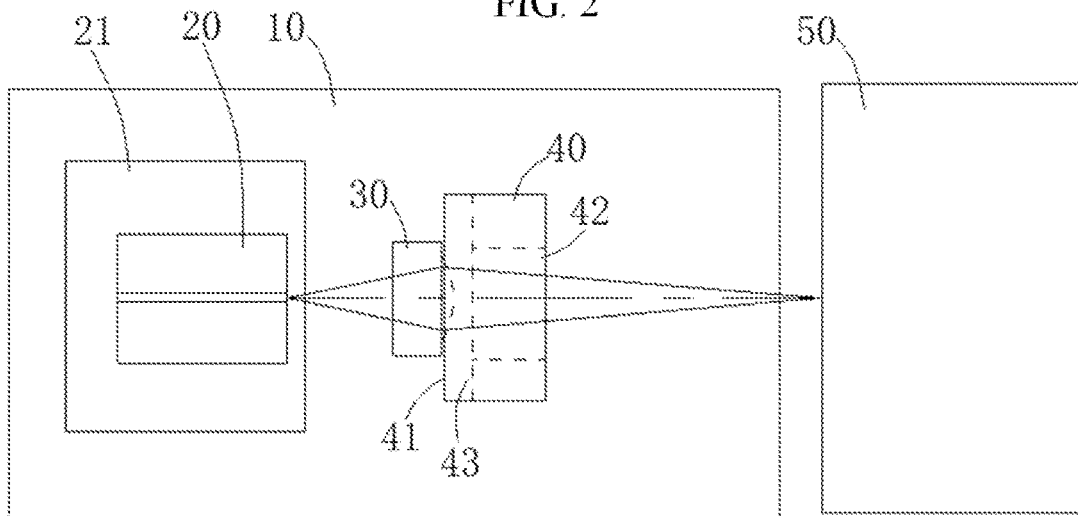
FIG. 3 is a top view of the optical assembly in FIG. 2.

FIG. 2 is a structural diagram of an optical assembly 101 according to a first embodiment of the present disclosure. FIG. 3 is a top view of the optical assembly 101 in FIG. 2. Specifically, as illustrated in FIG. 2 and FIG. 3, the optical assembly 101 of the first embodiment is an optical transmitter assembly comprising a semiconductor laser that serves as the light emitting element 20 (hereinafter also referred to as "semiconductor laser 20"), the lens component 30, and an optical waveguide 50. The semiconductor laser 20 is secured onto the carrier plate 10 by means of a base plate 21. The lens component 30 is installed onto the carrier plate 10 by means of the aforementioned securing block 40. The lens component 30 comprises the lens portion 31 and the connecting portion 32. The lens portion 31 is located on the optical path of the output light from the semiconductor laser 20. In the first embodiment, the lens portion 31 includes a coupling lens, which may be a high-magnifying-power spherical or aspherical lens. An optical signal transmitted from the semiconductor laser 20 is coupled into the optical waveguide 50 by the lens portion 31 of the lens component 30. The aforementioned optical waveguide 50 may alternatively be an optical integrated chip, an optical fiber, or another medium that transmits optical signals. Here, the carrier plate 10 may be a flat surface of a package housing. The carrier plate 10 may alternatively be a heat sink, or another flat plate such as a thermoelectric cooler (TEC) or a thermally conductive metal. Another optical component, such as a wavelength division multiplexer or demultiplexer, an optical isolator, or a polarization beam splitter component, may be added onto the optical path between the lens component 30 and the optical waveguide 50, which is also within the scope of protection of the present application.

In the first embodiment, the securing block 40 has the first surface 41 located on the optical path of the output light from the semiconductor laser 20. The securing block 40 also has a light-passing portion 42 located on the optical path, the light-passing portion 42 being a light-passing hole (hereinafter also referred to as "light-passing hole 42") that is configured on the securing block 40 and runs through a front and a back of the securing block 40. In other embodiments, the light-passing portion 42 may be a light-passing opening, i.e., an opening configured on one of a side, a bottom portion, or a top portion of the securing block, forming a "U"-like or reverse "U" structure. Alternatively, the securing block 40 may be a transparent block such as a glass block, or a transparent plate, so that the entire securing block 40 may serve as the light-passing portion 42. The bottom surface of the securing block 40 is bonded to the carrier plate 10, and the lens component 30 is secured onto the carrier plate 10 by means of bonding between the second surface 321 of the connecting portion 32 of the lens component 30 and the first surface 41 of the securing block 40. A clearance space is present between the lens portion 31 of the lens component 30 and the light-passing portion 42 of the securing block 40 so that the lens portion 31 does not contact the securing block 40. In the first embodiment, the lens component 30 is located between the semiconductor laser 20 and securing block 40. A lens surface 311 of the lens portion 31 protrudes from the second surface 321 of the connecting portion 32, and the aforementioned clearance space is a clearance recess 43 configured on the first surface 41 of the securing block 40 to provide clearance for the lens portion 31 of the lens component 30. Here, the clearance recess 43 is a through groove (hereinafter also referred to as "through groove 43") that is on the first surface 41 of the securing block 40 and connects two sides of the securing block 40. The width of the through groove 43 is greater than the diameter of the light-passing hole 42 to provide adequate adjustment space for the lens portion 31. The connecting portion 32 of the lens component 30 is bonded to a portion of the first surface 41 above the clearance recess 43. In other embodiments, the connecting portion 32 of the lens component 30 may alternatively be bonded to a portion of the first surface 41 of the securing block 40 below the clearance recess 43. Alternatively, the connecting portion 32 may extend both above and below the lens portion 31 of the lens component 30, and the connecting portion 32 is bonded to two portions of the first surface 41 above and below the clearance recess 43, respectively. The clearance recess 43 may alternatively be a recess in a shape such as a circle, square, or another polygon that is larger in size than the light-passing hole 42. The size of the clearance recess 43 may alternatively be equal to or smaller than the size of the light-passing portion 42.

Upon starting up of the semiconductor laser 20, an optical signal transmitted from the semiconductor laser 20 is focused by the lens portion 31 of the lens component 30 and then passes through the light-passing hole 42 of the securing block 40 before converging into the optical waveguide 50. During assembly, the semiconductor laser 20 and the optical waveguide 50 are installed first, then the securing block 40 and the lens component 30 are placed on the optical path between the semiconductor laser 20 and the optical waveguide 50, and glue is dispensed between the second surface 321 of the connecting portion 32 of the lens component 30 and the first surface 41 of the securing block 40 and between the bottom surface of the securing block 40 and the carrier plate 10. In order to maximally couple the optical signal transmitted from the semiconductor laser 20 into the optical waveguide 50, pressure is applied to make the glue layer b between the securing block 40 and the carrier plate 10 thin. The lens component 30 is grasped with a gripping device or a suction nozzle to be moved closer to and pressed against a glue dispensation area between the lens component 30 and the first surface 41 of the securing block 40. The securing block 40 and the lens component 30 are moved together along a direction of the optical path to an optimal coupling distance. The relative position of the lens component 30 and the securing block 40 is adjusted to an optimal position. Finally, the glue layer b between the second surface 321 of the connecting portion 32 of the lens component 30 and the first surface 41 of the securing block 40 and the glue layer a between the bottom surface of the securing block 40 and the carrier plate 10 are cured. An ultraviolet glue may be used as a bonding agent, and the glue at the aforementioned two areas is cured with an ultraviolet light. Alternatively, another bonding agent may be used. These are all within the scope of protection of the present disclosure.

Since the securing block 40 and the connecting portion 32 of the lens component 30 may be made larger in size, all of the flat surfaces in areas where glue is applied may be made to have a very good degree of flatness, so that the evenness and thinness of the glue layers between the lens component 30 and the securing block 40 and between the securing block 40 and the carrier plate 10 may be ensured. Furthermore, the lens component 30 does not contact the carrier plate 10, thereby preventing, if the bottom portion of the lens component 30 was to be glued to the carrier plate 10, the problem of uneven glue thickness at the bottom portion of the lens component 30 that may be caused by a cutting angle, minimizing the problem of the position of the lens component 30 deviating easily as a result of temperature changes or moisture absorption when the glue layer b is too thick, and thus effectively improving the stability and reliability of the assembly and the entire device. The adjustment of the positions of the lens component 30 and the securing block 40 in coordination allows the adjustment of the position of the lens in the lens component 30 along three dimensions, thereby achieving precise coupling or collimating and improving assembly efficiency for the assembly. At the same time, only one securing block 40 is used for the installation of the lens component 30. Therefore, product consistency is easy to control and operability is high, thus further improving operational consistency and product reliability.

Second Embodiment

Figure 4:
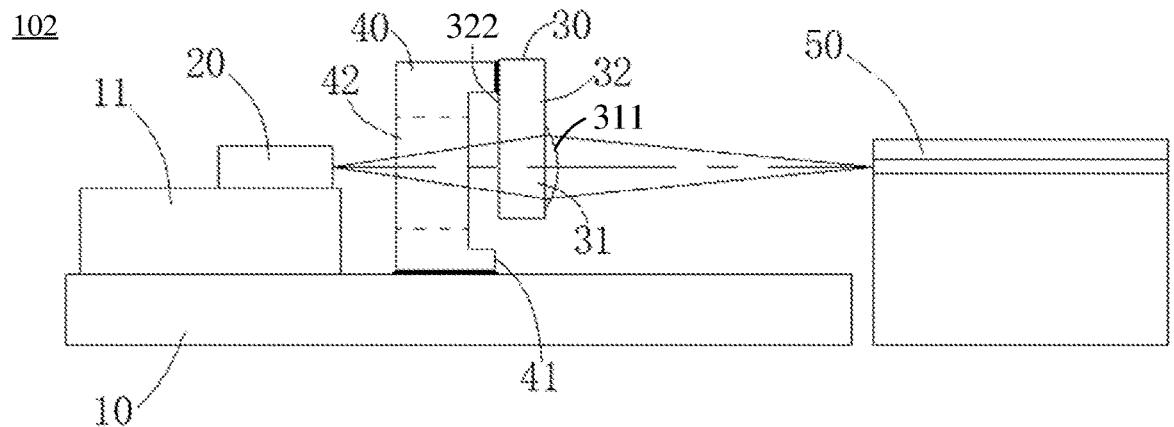
FIG. 4 is a structural diagram of an optical assembly according to a second embodiment of the present disclosure.

FIG. 4 is a structural diagram of an optical assembly 102 according to a second embodiment of the present disclosure. As illustrated in FIG. 4, the optical assembly 102 of the second embodiment, similar to the first embodiment, is an optical transmitter assembly. The second embodiment differs from the first embodiment in that the securing block 40 is located on the optical path between the semiconductor laser 20 and the lens component 30, and an optical signal transmitted from the semiconductor laser 20 passes through the light-passing portion 42 of the securing block 40 before it is focused by the lens portion 31 of the lens component 30 and converges into the optical waveguide 50. When another optical component is present between the lens component 30 and the optical waveguide 50, the configuration of the securing block 40 on the optical path between the lens component 30 and the semiconductor laser 20 may allow for more accommodation space for the other optical component. In the second embodiment, the lens component 30 is secured by means of glue between a third surface 322 on its flat surface side and the securing block 40, and no clearance recess needs to be configured on the securing block 40. In one embodiment, the third surface 322 is a flat surface. Here, the flat surface side of the lens component 30 refers to a flat surface that faces away from the protruding lens surface 311.

Third Embodiment

Figure 5:
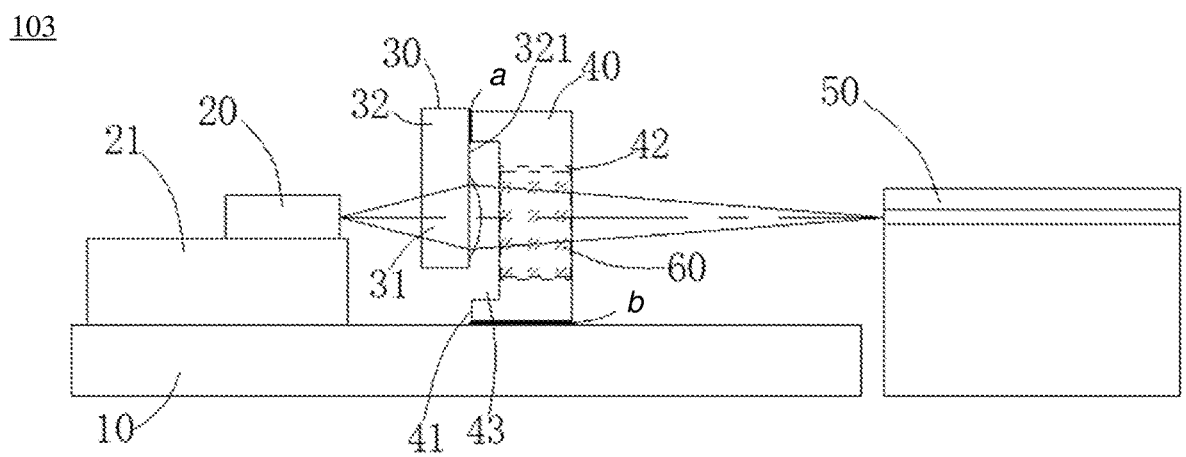
FIG. 5 is a structural diagram of an optical assembly according to a third embodiment of the present disclosure.

FIG. 5 is a structural diagram of an optical assembly 103 according to a third embodiment of the present disclosure. As illustrated in FIG. 5, the optical assembly 103 of the third embodiment, similar to the first and second embodiments, is an optical transmitter assembly. The third embodiment differs from the first and second embodiments in that an optical isolator 60 is added onto the optical path, and the optical isolator 60 may isolate a return light traveling in a backward direction so as to prevent the return light from entering into the semiconductor laser 20 and affecting the stability of the device. In the third embodiment, the optical isolator 60 is configured in the light-passing hole 42 of the securing block 40 and may effectively reduce the length of the device. In other embodiments, the optical isolator 60 may alternatively be replaced with a polarizer component, a polarization light splitter component, a wave plate, an optical filter, etc., or a combination thereof. Here, the optical isolator 60 is disposed on the optical path between the lens component 30 and the optical waveguide 50. In other embodiments, the optical isolator 60 may alternatively be disposed on the optical path between the lens component 30 and the semiconductor laser 20. For example, the optical isolator may be added in the light-passing hole 42 of the securing block 40 of the structure of the second embodiment.

Fourth Embodiment

Figure 6:
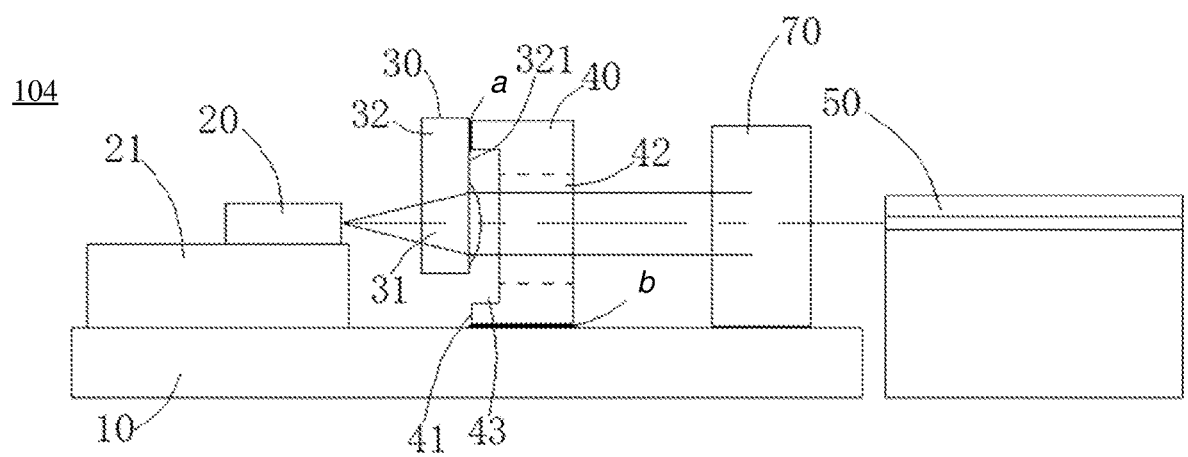
FIG. 6 is a structural diagram of an optical assembly according to a fourth embodiment of the present disclosure.

FIG. 6 is a structural diagram of an optical assembly 104 according to a fourth embodiment of the present disclosure. As illustrated in FIG. 6, the optical assembly 104 of the fourth embodiment differs from all of the aforementioned embodiments in that the optical assembly 104 further comprises a wavelength division multiplexer 70 configured on the optical path after the lens component 30. In other embodiments, the optical assembly 104 may alternatively comprise a wavelength division multiplexer, a beam shaping component, an optical path adjustment component, etc., or a combination thereof. Here, the lens portion 31 of the lens component 30 is a collimating lens. During installation, the lens portion 31 needs to be adjusted to an optimal collimating position to collimate an optical signal transmitted from the semiconductor laser 20, and the collimated optical signal is combined by the aforementioned wavelength division multiplexer 70 before entering into the optical waveguide 50.

Fifth Embodiment

Figure 7:
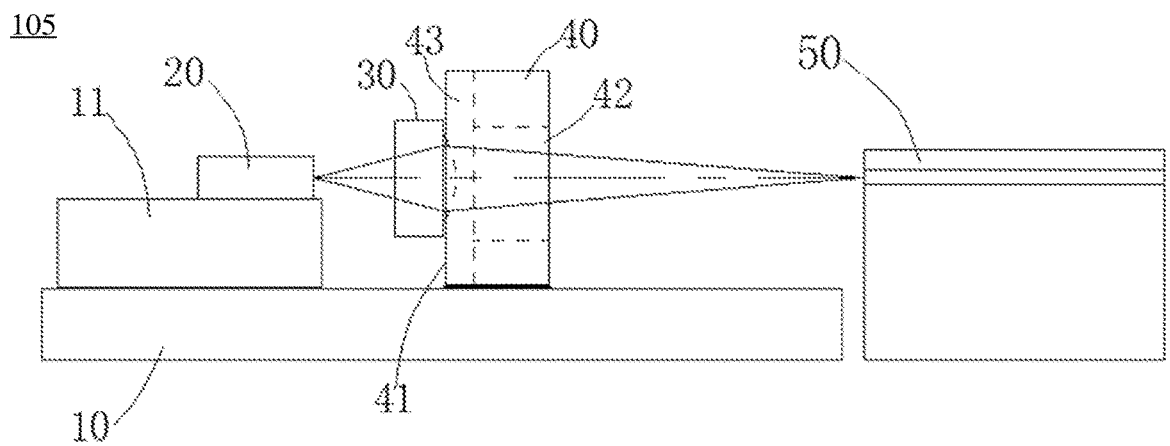
FIG. 7 is a structural diagram of an optical assembly according to a fifth embodiment of the present disclosure.
Figure 8:
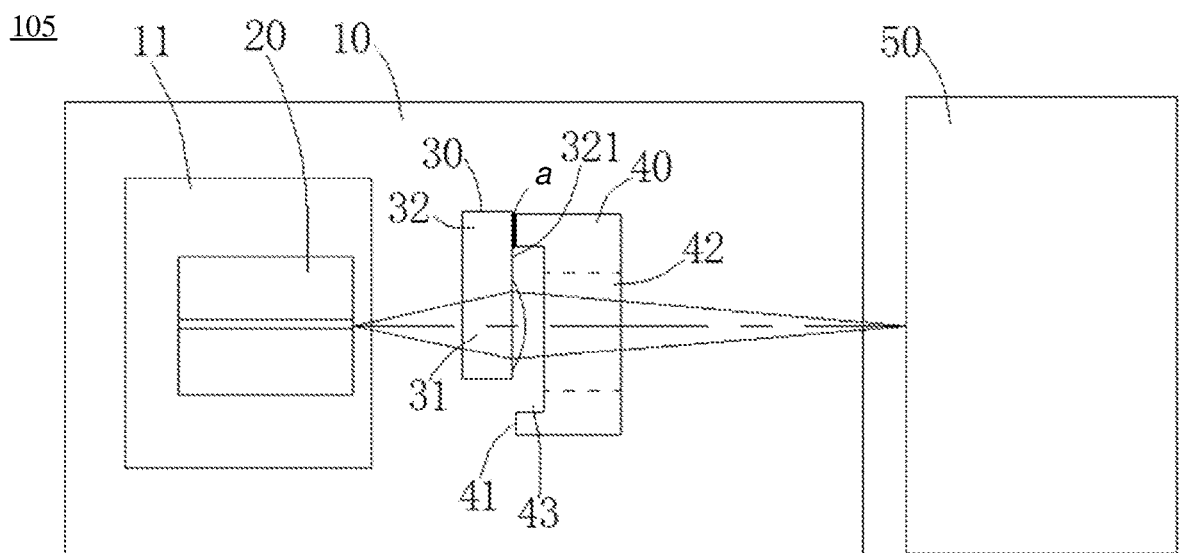
FIG. 8 is a top view of the optical assembly in FIG. 7.

FIG. 7 is a structural diagram of an optical assembly 105 according to a fifth embodiment of the present disclosure. FIG. 8 is a top view of the optical assembly 105 in FIG. 7. As illustrated in FIG. 7 and FIG. 8, the fifth embodiment differs from all of the aforementioned embodiments in that the clearance recess 43 of the securing block 40 is a through groove that is on the first surface 41 of the securing block 40 and connects the bottom surface and a top surface of the securing block 40. The size of the through groove is greater than the size of the light-passing hole 42 to provide adequate adjustment space for the lens portion 31. The connecting portion 32 of the lens component 30 is bonded to a portion of the first surface 41 on one side of the clearance recess 43, and the lens portion 31 faces the clearance recess 43. In other embodiments, the connecting portion 32 may alternatively extend on two sides of the lens portion 31 of the lens component 30, and the connecting portion 32 is bonded to two portions of the first surface on two sides of the clearance recess 43, respectively.

Sixth Embodiment

Figure 9:
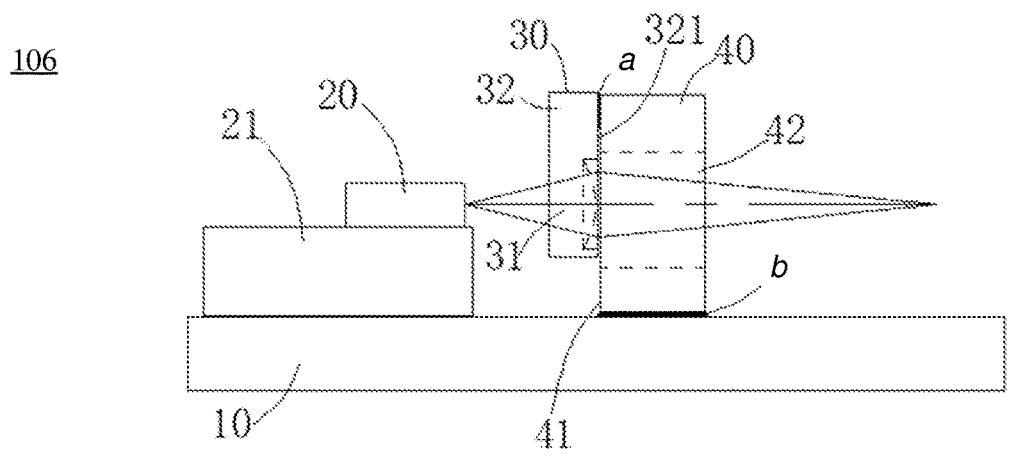
FIG. 9 is a structural diagram of an optical assembly according to a sixth embodiment of the present disclosure.
Figure 10:
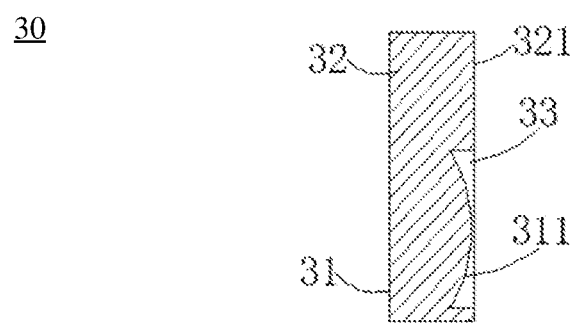
FIG. 10 is a longitudinal section diagram of the lens component in FIG. 9 along the direction of an optical path.

FIG. 9 is a structural diagram of an optical assembly 106 according to a sixth embodiment of the present disclosure. FIG. 10 is a longitudinal section diagram of the lens component 30 in FIG. 9 along the direction of the optical path. As illustrated in FIG. 9 and FIG. 10, the sixth embodiment differs from all of the aforementioned embodiments in that the clearance space between the lens portion 31 of the lens component 30 and the light-passing portion 42 of the securing block 40 is a recess 33 disposed on the lens portion 31. The assembly method of the optical assembly 106 of the sixth embodiment is the same as that of the first embodiment and is not repeated here. The recess 33 faces the first surface 41 of the securing block 40. The lens surface 311 of the lens portion 31 is disposed in the recess 33. The lens surface 311 is configured in a recessed manner relative to the second surface 321 of the connecting portion 32 so that the lens surface 311 of the lens portion 31 does not contact the securing block 40, thereby protecting the lens of the lens portion 31 from contamination or damage by the glue or the securing block 40.

Similarly, the optical assembly in each of the example embodiments described above may alternatively be an optical receiver assembly, comprising an light emitting element such as an optical waveguide or an optical fiber, a lens component, and an optical detector that serves as an optical receiver component. The optical waveguide or optical fiber may also be another component for inputting an optical signal, and the optical signal is inputted through the optical waveguide or optical fiber before being coupled and focused by the lens component onto the optical detector. The optical receiver component may alternatively may be an optical integrated chip, etc. Similarly, a wavelength division demultiplexer, a beam shaping component, an optical path adjustment component, etc., or a combination thereof may be configured between the lens component and the optical waveguide or optical fiber to shape the optical path.

Embodiments of the present disclosure provide the following benefits. The embodiments of the present disclosure provide an improved structure for the securing block to secure the lens component. Moving the lens component and the securing block in coordination allows the adjustment of the position of the lens along three dimensions, thereby achieving precise coupling or collimating. The structure provided by the embodiments of the present disclosure makes it easy to control the thickness of the glue layer in each bonding area within a small range, thereby preventing the position of the lens from deviating easily as a result of temperature changes or moisture absorption when the glue layer is too thick or uneven. Additionally, the structure reduces the number of components used for securing, further improving operational consistency and product reliability and providing high operability.

The series of detailed descriptions above is only intended to provide specific descriptions of feasible embodiments of the present disclosure. They are not to be construed as limiting the scope of protection for the present disclosure. All equivalent embodiments or changes that are not detached from the technology of the present disclosure in essence should fall under the scope of protection of the present disclosure.

What is claimed is:

1. An optical assembly, comprising:
a carrier plate;
a light emitting element and a lens component disposed on the carrier plate; and
a securing block,
wherein
the securing block has a first surface and a light-passing portion near the first surface, the light-passing portion arranged on an optical path of an output light from the light emitting element,
the lens component comprises a lens portion and a connecting portion, the lens portion is located on the optical path, and the connecting portion has a second surface facing the first surface of the securing block,
a bottom surface of the securing block is bonded to the carrier plate, and the lens component is secured onto the carrier plate by means of bonding between the second surface of the connecting portion and the first surface of the securing block, and
a clearance space is present between the lens portion and the light-passing portion.

2. The optical assembly of claim 1, wherein a lens surface of the lens portion protrudes from the second surface of the connecting portion, and the clearance space is a clearance recess configured on the first surface of the securing block to provide clearance for the lens portion of the lens component.

3. The optical assembly of claim 2, wherein the clearance recess is a through groove that is on the first surface and connects two sides of the securing block.

4. The optical assembly of claim 2, wherein the clearance recess is a through groove that is on the first surface and connects the bottom surface and a top surface of the securing block.

5. The optical assembly of claim 1, wherein the clearance space is a recess disposed on the lens portion, the recess faces the first surface of the securing block, the lens surface of the lens portion is disposed in the recess, and the lens surface is configured in a recessed manner relative to the second surface of the connecting portion.

6. The optical assembly of claim 1, wherein the light-passing portion is a light-passing hole or a light-passing opening; or, the securing block is a transparent securing block.

7. The optical assembly of claim 6, wherein arranged in the light-passing hole or light-passing opening is one of the following: an optical isolator, a polarization component, a polarization light splitter component, a wave plate, or an optical filter.

8. The optical assembly of claim 1, wherein
the connecting portion of the lens component is bonded by glue to the first surface, and a glue layer between the connecting portion of the lens component and the first surface is less than or equal to 20 μm in thickness; and
the bottom surface of the securing block is bonded by glue to the carrier plate, and a glue layer between the bottom surface of the securing block and the carrier plate is less than or equal to 20 μm.

9. The optical assembly of claim 1, wherein the light emitting element is a semiconductor laser,
the optical assembly further comprises an optical waveguide, an optical integrated chip, or an optical fiber, and
an optical signal transmitted from the semiconductor laser passes through the lens component before entering into the optical waveguide, optical integrated chip, or optical fiber.

10. The optical assembly of claim 9, wherein the optical assembly further comprises a wavelength division multiplexer, a beam shaping component, an optical path adjustment component, or a combination thereof, on the optical path between the lens component and the optical waveguide or optical fiber.

11. The optical assembly of claim 1, wherein the light emitting element is an optical waveguide or an optical fiber,
the optical assembly further comprises an optical receiver component, and
an optical signal outputted from the optical waveguide or optical fiber passes through the lens component before being received by the optical receiver component.

* * * * *